Patented Jan. 11, 1927.

1,614,019

UNITED STATES PATENT OFFICE.

WILLIAM BEACH PRATT, OF WELLESLEY, MASSACHUSETTS, ASSIGNOR TO RESEARCH, INCORPORATED, OF BOSTON, MASSACHUSETTS, A CORPORATION OF MASSACHUSETTS.

SPONGE-RUBBER PRODUCT AND PROCESS OF MAKING THE SAME.

No Drawing.  Application filed October 17, 1923. Serial No. 669,027.

This invention relates to the production of sponge rubber. I have discovered that, by the use of dispersed rubber either in the form of the natural latex or in the form of an aqueous dispersion of previously coagulated rubber, I am able to produce sponge rubber of any desired consistency or texture by employing with the dispersed rubber suitable vulcanizing agents, such for example as sulphur, pigments, fillers, colors and suitable accelerators to effect or control the vulcanization.

In an application for Letters Patent filed by me on September 13, 1923, Serial No. 622,556, I have described a process by which one may disperse in water previously coagulated or crude rubber so that the particles or globules of rubber, which constitute the disperse phase of the dispersion, are of the same size and form as the rubber globules in latex. This process, generally speaking, consists in introducing into the rubber mass, after it has been softened on the compounding roll, a certain amount of water, and then separating the globules and dispersing them in water by manipulating and stretching the mass in the presence of water and a lubricating agent which is preferably of a soapy nature, such for example as saponin, soap bark extract or the like. The initial introduction of the water into the rubber mass may be facilitated by compounding with the rubber certain water-soluble substances such as glue. I have also explained in the said application that, previous to the dispersion of the rubber mass, there may be compounded with the crude rubber various materials including sulphur, pigments, vulcanization accelerators, and various organic or inorganic materials such as mineral rubber, dyes or the like.

Also in an application for Letters Patent filed by me on July 2, 1923, Serial No. 649,157, I have described a process by which natural latex may be concentrated to any desirable extent without causing the coagulation of the rubber globules, and that to the concentrate, which consists of the rubber globules in an aqueous medium, various compounding materials may be added such as finely divided sulphur, a vulcanization accelerator, zinc oxide or the like. By either process thus herein referred to, I produce a smooth aqueous pasty mass consisting of separated and dispersed rubber globules and vulcanizing agents in an aqueous medium. The concentration of this paste may be varied as desired, as for instance, by diluting the paste with water. By taking a suitable portion of this mass and introducing it into a mold of any desired size and shape and subjecting it to vulcanization, I am able to produce a sponge of rubber having the desired consistency, this being secured by varying the proportions and concentrations of the dispersed rubber compound and by varying the extent to which the mold cavity is filled with the dispersed compound.

I recognize the fact that it is known in the art that one may introduce water into any given rubber compound by a milling operation either with or without the use of certain salts, and by causing the swelling of the mass and the rupture of its structure during vulcanization to secure a sponge rubber product; but such methods as heretofore practiced do not result in a uniformity of product or control the character of the resulting mass. Moreover such methods do not permit as great variation in the porosity of the product as may be secured in accordance with the present invention.

As an example of the procedure in the practice of my invention I may cite the following. After the crude rubber has been softened on the mill, I compound with 500 parts of rubber 40 parts of sulphur, 50 parts of zinc oxide, 40 parts of red iron oxide, and 80 parts of ethylidene aniline. This compound is now dispersed in water in accordance with the process hereinbefore referred to, by which to 710 parts of the compounded mass there is now added 350 parts of water. The resulting product is a smooth paste in which the rubber globules and the compounding materials are dispersed or are in suspension, the water constituting the continuous phase of the dispersion. I introduce a sufficient amount of this paste into the mold of the desired size and shape so as to fill about one-third of the volume of the mold cavity. This is now placed in an ordinary vulcanizing press and heat is applied to an extent sufficient to raise the temperature of the aqueous dispersed rubber compound to the point where steam is generated and the gases formed cause the rubber to swell and entirely to fill the mold. I preferably maintain the temperature at this stage below that of vulcanization for the purpose of securing a sponge rubber of uniform porosity. After allowing sufficient time for this operation, which usually takes about thirty minutes, I then raise the temperature to the vulcanizing point and maintain the temperature thereat for about one hour. By varying the extent to which the mold is initially filled or by varying the proportion of the water to the remainder of the mass, I am able to secure great variation in the texture and consistency of the resulting product. Thus I am able to produce a sponge rubber of exceedingly fine grain in which the pores of the rubber are minute in size, thereby making available a product which has superior characteristics or qualities for use as a shock absorber or for other purposes where a high degree of resiliency and compressibility are desirable.

I have found that various other materials, in addition to those hereinbefore mentioned, may be incorporated in the dispersed rubber compound where special results are desirable. For example, I have found that soap may be added to the mass so as to produce a sponge rubber containing soap. This may be accomplished either by adding soap to the rubber compound when it is being softened on the mill and then dispersing such compound in water, or else by first forming a dispersion of rubber and any desirable vulcanizing agents, and then adding to the dispersed compound a liquid soap. By either method a sponge rubber is produced containing a quantity of free soap which is distributed throughout the body thereof and which renders the sponge rubber capable of many uses. Thus a cake of sponge-rubber soap thus produced may contain any grade of soap which may be desired either for toilet purposes, or for washing automobiles, painted surfaces or the like or cleansing clothes. Where a sponge rubber is to be employed for toilet purposes, various perfumes may be added to the dispersed compound. The rubber sponge may be formed as a cake or in any other suitable shape. By employing a soap such as is employed for shaving purposes, the sponge rubber can be vulcanized in the shape of a cylindrical stick and can be used in the same manner in lathering the face as a brush, the soap being supplied from the pores of the sponge and forming the lather.

From the foregoing it will be seen that by the process described I am able to produce a vulcanized rubber sponge of any desirable character for any particular purpose according to the substances which are contained in the aqueous rubber dispersion. In particular, a rubber sponge containing soap as herein described possesses many advantages, since the rubber sponge supplies such soap as may be needed when it is used. The soap is slowly extracted by the water which may be used in connection therewith, and the rubber sponge thus formed is capable of long usage before the soap is entirely extracted.

I claim:

1. A method of producing sponge rubber which comprises placing in a mold, adapted to be closed, an uncoagulated aqueous paste comprising dispersed rubber gloubles and vulcanizing agents, closing the mold, and subjecting the same and the contained mass to a vulcanizing temperature.

2. A method of producing sponge rubber which comprises forming an uncoagulated aqueous paste containing dispersed rubber and sulphur, partially filling a mold, adapted to be closed, with said uncoagulated paste, closing the mold, heating the mold and the contained mass first at or above the boiling point of the contained water, and then at a vulcanizing temperature.

3. A method of producing sponge rubber which comprises forming an aqueous paste containing rubber, sulphur and soap, and molding and vulcanizing said mass.

4. A method of producing sponge rubber containing free soap in the pores thereof which comprises forming an aqueous paste containing rubber, sulphur, free water-soluble soap and perfume, introducing the mass into a mold, and subjecting the same to vulcanization.

5. That step in the manufacture of sponge rubber comprising the placing of an aqueous paste of non-coagulated dispersed crude rubber and sulphur in a closed mold, which consists in varying the texture and consistency of the final product by introducing a greater or a smaller quantity of said uncoagulated paste into a mold cavity of certain proportions before the mold is closed and is subjected to a vulcanizing temperature.

6. Vulcanized sponge rubber containing free soap distributed throughout the same.

7. As a new article of manufacture a mass of vulcanized sponge rubber containing perfume and a free soap distributed throughout the mass.

In testimony whereof I have affixed my signature.

WILLIAM BEACH PRATT.